United States Patent
Asagi et al.

(10) Patent No.: US 8,041,181 B2
(45) Date of Patent: Oct. 18, 2011

(54) ELECTRONIC APPARATUS, SECURITY MANAGEMENT PROGRAM AND SECURITY MANAGEMENT METHOD

(75) Inventors: Ryota Asagi, Tachikawa (JP); Yosuke Konaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1251 days.

(21) Appl. No.: 11/422,616

(22) Filed: Jun. 7, 2006

(65) Prior Publication Data

US 2007/0217764 A1    Sep. 20, 2007

(30) Foreign Application Priority Data

Mar. 10, 2006 (JP) ................................. 2006-065977

(51) Int. Cl.
    *H04N 5/77* (2006.01)
(52) U.S. Cl. ..................................... 386/224
(58) Field of Classification Search ............ 386/46, 386/95, 107, 117, 125, 200, 224, 252; 713/186; 235/379
    See application file for complete search history.

(56) References Cited

U.S. PATENT DOCUMENTS

| | | | | |
|---|---|---|---|---|
| 5,694,514 A | * | 12/1997 | Evans et al. | 386/46 |
| 6,072,894 A | * | 6/2000 | Payne | 382/118 |
| 6,592,029 B2 | * | 7/2003 | Brikho | 235/379 |
| 6,731,778 B1 | | 5/2004 | Oda et al. | |
| 7,114,079 B1 | * | 9/2006 | Cook et al. | 713/186 |
| 2002/0176610 A1 | * | 11/2002 | Okazaki et al. | 382/118 |
| 2003/0108334 A1 | * | 6/2003 | Nevenka et al. | 386/95 |

FOREIGN PATENT DOCUMENTS

| | | |
|---|---|---|
| JP | 2001-169272 | 6/2001 |
| JP | 2002-288030 A | 10/2002 |
| JP | 2003-101640 | 4/2003 |
| JP | 2004-5273 A | 1/2004 |
| JP | 2005-135313 | 5/2005 |

OTHER PUBLICATIONS

Japanese Notice of Rejection Grounds, Partial English-language Translation, mailed Apr. 12, 2011 for corresponding Japanese Application No. 2006-065977.

"Japanese Office Action", mailed by JPO and corresponding to Japanese application No. 2006-065977 on Jul. 5, 2011, with partial English translation.

* cited by examiner

*Primary Examiner* — Huy T Nguyen

(74) *Attorney, Agent, or Firm* — Fujitsu Patent Center

(57) ABSTRACT

The present invention provides an electronic apparatus, including a photographing apparatus control unit controlling a photographing apparatus; and an access management unit performing an operation for recording, in history information by correlating with an information name invested to specific information, an image of an operator photographed by way of the photographing apparatus control unit at the time of an occurrence of an access to the specific information.

12 Claims, 9 Drawing Sheets

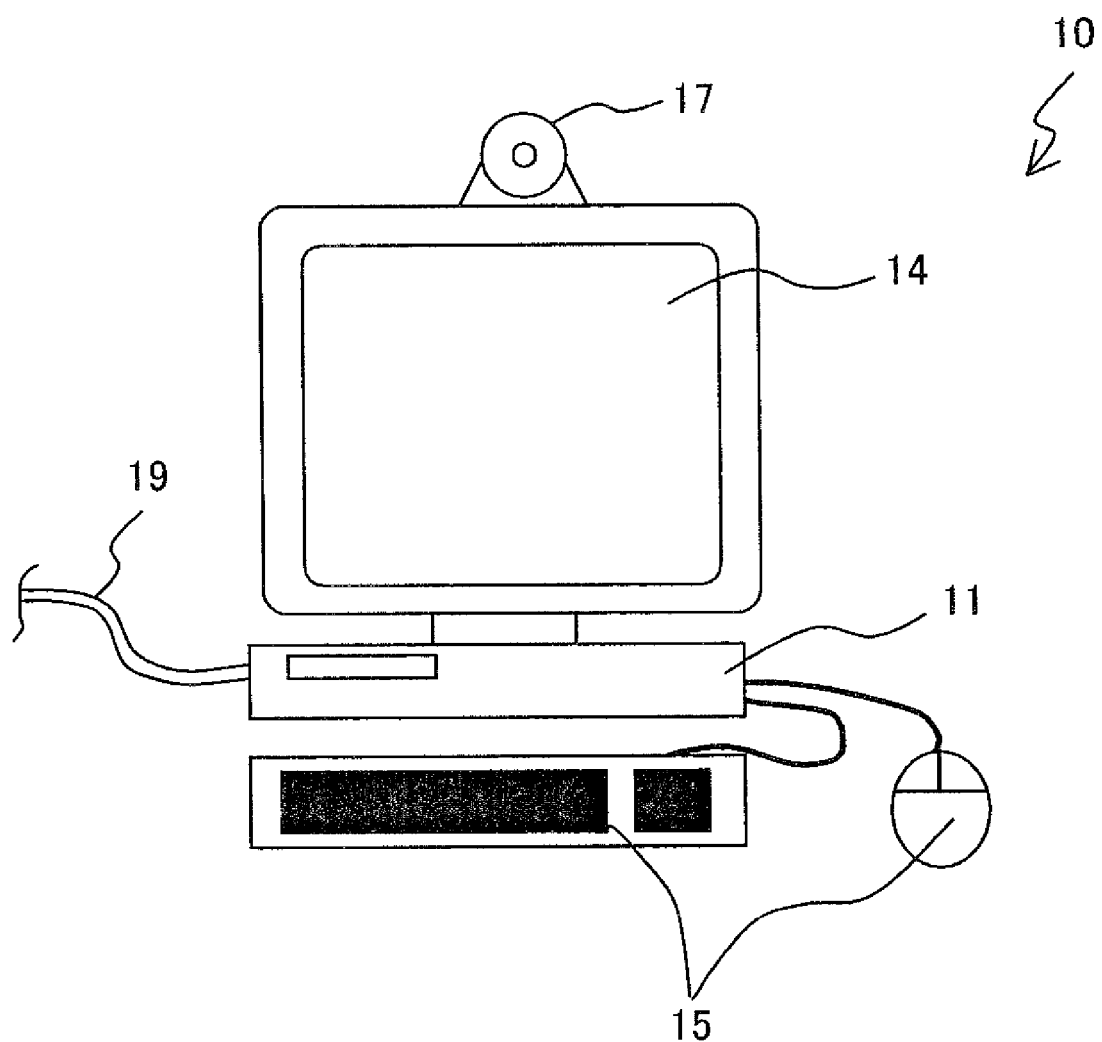
F I G. 3

ACCESS MANAGEMENT FILE

| MANAGEMENT TARGET FILE NAME | ACCESS DATE & TIME | ELECTRONIC APPARATUS ID | USER IMAGE INFORMATION |
|---|---|---|---|
| ABCD.EXL | Dec. 15, 2005 15:42:33 | XZY | 123.gif |
| | | | |
| ⋮ | ⋮ | ⋮ | ⋮ |

61-1

61a  61b  61d  61c

F I G. 7

| MANAGEMENT TARGET FILE NAME | ACCESS DATE & TIME | ELECTRONIC APPARATUS ID | USER IMAGE INFORMATON |
|---|---|---|---|
| 61a | 61b | 61d | 61c |

F I G. 8

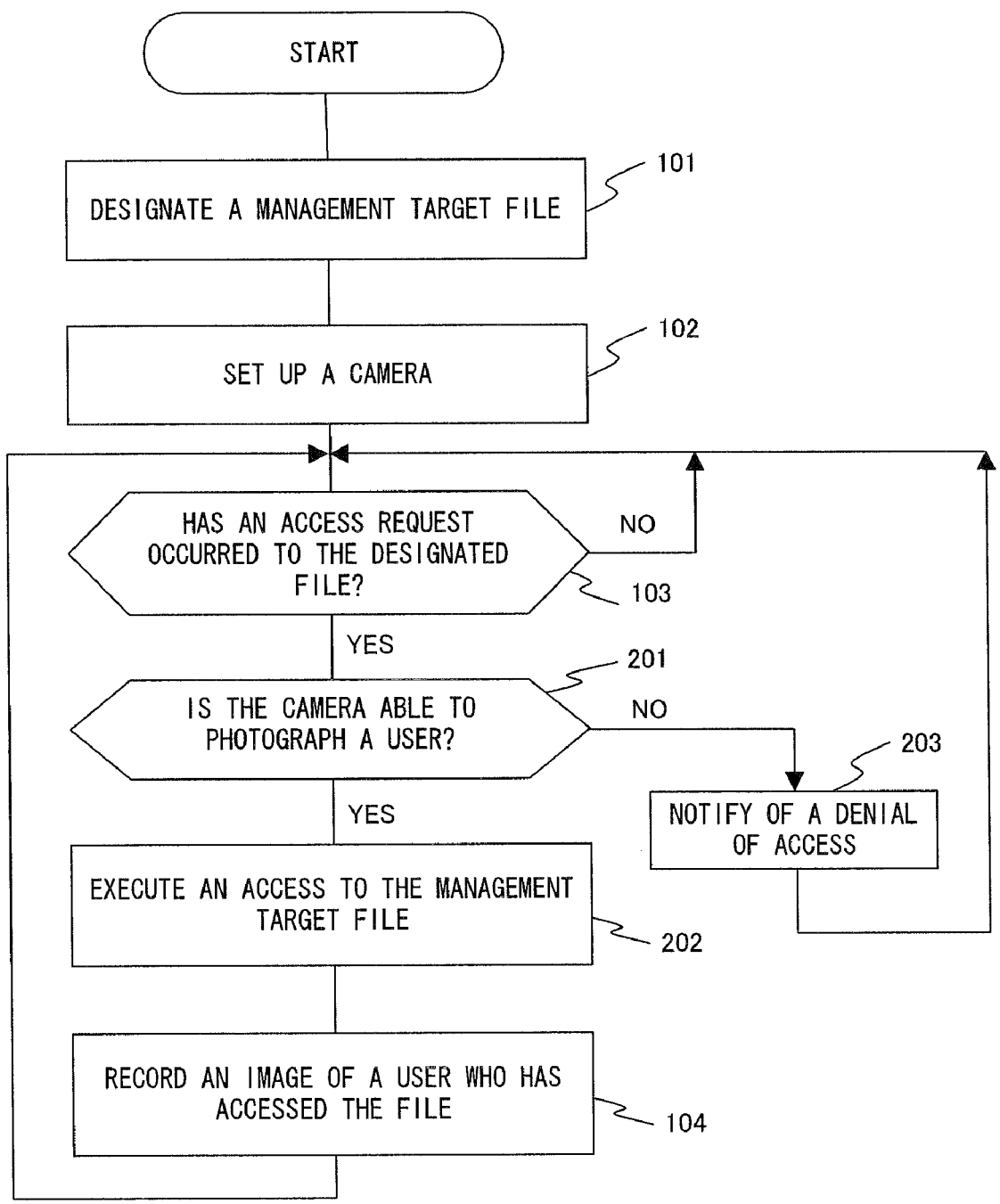
F I G. 9

ELECTRONIC APPARATUS, SECURITY MANAGEMENT PROGRAM AND SECURITY MANAGEMENT METHOD

BACKGROUND OF THE INVENTION

1. Field of the Invention

The present invention relates to an electronic apparatus, a security management program and a security management method, and in particular to a technique effectively applicable to a security management technique for use in an electronic apparatus such as computer, personal digital assistance (PDA) and portable phone.

2. Description of the Related Art

Keeping pace with the development of information societies and a wide propagation of diverse electronic apparatuses, a secure protection of information handled in information processing systems, electronic apparatuses, et cetera, is strongly demanded. In the case of an illegitimate use being carried out, a quick investigation of a cause is inevitable for a containment of damages and a prevention of recurrence.

Consequently, there has been a conventional technique for use in a monitor system for monitoring an operation of an automatic teller machine (ATM), in which a field angle of a camera with a lens is divided by a mirror, thereby monitoring a plurality of places including a face, hands, et cetera, of a user by using a single camera, as disclosed in a patent document 1.

A patent document 2 has disclosed a technique for use in a portable phone, which judges as an illegitimate use if a pass code input for a user certification is in error for a predetermined number of times continuously, photographs the user who has input the pass code and transmits the photographed data to a pre-registered phone number.

A patent document 3 has disclosed a technique for use in a product management system for managing products by attaching an IC tags thereto, which photographs a surrounding area of a show case by linking with an operation for taking out a product therefrom, thereby recording an image of a person who has taken out the product.

The above described technique presented by the patent document 1, however, continuously photographs images of the surrounding area of the ATM, and therefore a volume of the image date grows large, making a capacity of a storage medium for storing the image becomes large. And it takes a substantial amount of time to search a necessary image at an occurrence of damage.

The case of the above described patent document 2 stores only an image at the time of a certification failure, and therefore is unable to perform a monitor of an operation following a successful certification or a cause analysis.

That is, a damage caused by an illegitimate use is much greatly induced by an illegitimate operation following the illegitimate certification, and therefore an image photographed thereafter is more effective for the cause investigation. The technique put forth in the patent document 2, however, does not provide an image after a successful certification, and therefore it is difficult to use for a cause investigation such as illegitimate access.

The technique proposed by the patent document 3 is useful for a cause investigation of a goods theft, et cetera, while it is useless for protecting intangible information processing, et cetera, because an IC tag cannot be attached thereto.

[Patent document 1] Laid-Open Japanese Patent Application Publication No. 2001-169272

[Patent document 2] Laid-Open Japanese Patent Application Publication No. 2003-101640

[Patent document 3] Laid-Open Japanese Patent Application Publication No. 2005-135313

SUMMARY OF THE INVENTION

A purpose of the present invention is to provide a technique enabling a quick identification of a user accessing information of an electronic apparatus.

Another purpose of the present invention is to provide a technique enabling an accomplishment of a security management for information by using an image without requiring a large capacity storage resource for accumulating images.

Yet another purpose of the present invention is to provide a technique enabling a prevention of an illegitimate operation.

A first aspect of the present invention is to provide an electronic apparatus including a photographing apparatus control unit controlling a photographing apparatus; and an access management unit performing an operation for recording, in history information by correlating with an information name invested to specific information, an image of an operator photographed by way of the photographing apparatus control unit at the time of an occurrence of an access to the specific information.

A second aspect of the present invention is to provide the electronic apparatus according to the first aspect, further including a telecommunication unit, wherein the access management unit performs an operation for transmitting the history information to another electronic apparatus by way of the telecommunication unit.

A third aspect of the present invention is to provide the electronic apparatus according to the first aspect, wherein the access management unit performs an operation for inhibiting an access to the specific information in the case of the photographing apparatus being inoperable and/or in the case of the image of the operator obtained by the photographing apparatus being a failure.

A fourth aspect of the present invention is to provide the electronic apparatus according to the first aspect, wherein the history information includes the information name invested to the specific information, the image information of the operator and a photographed date and time.

A fifth aspect of the present invention is to provide the electronic apparatus according to the first aspect, wherein the history information includes apparatus identifier information invested to the electronic apparatus of a transmission origin or an installed place thereof, the information name invested to the specific information, the image information of the operator and a photographed date and time in the case of transmitting the aforementioned history information to another of the electronic apparatus.

A sixth aspect of the present invention is to provide the electronic apparatus according to the first aspect, wherein the access management unit constitutes a part of an application program executed at the electronic apparatus and detects, in the inside of the aforementioned application program, an operation of the operator accessing the specific information.

A seventh aspect of the present invention is to provide the electronic apparatus according to the first aspect, wherein the access management unit constitutes a part of an operating system installed in the electronic apparatus, and detects an occurrence of an access request for the specific information, which is requested from an application program operating on the operating system to the aforementioned operating system.

An eighth aspect of the present invention is to provide the electronic apparatus according to the first aspect, wherein the access management unit is constituted by a utility program differing from an operating system and an application program which are installed in the electronic apparatus, and detects, by way of the aforementioned operating system, an occurrence of an access request for the specific information, which is requested from an application program operating on the operating system to the aforementioned operating system.

A ninth aspect of the present invention is to provide the electronic apparatus according to the first aspect, wherein the photographing apparatus is placed apart from a frame of the electronic apparatus.

A tenth aspect of the present invention is to provide a signal carrying a security management program installed in an electronic apparatus, wherein the program makes the electronic apparatus carry out the processes of detecting whether or not an access to a specific information has occurred as a result of operating the electronic apparatus; photographing, by using a photographing apparatus, an image of an operator of the electronic apparatus at the time of an occurrence of the access; and recording, in history information, the image by correlating with an information name invested to the specific information.

An eleventh aspect of the present invention is to provide the signal carrying a security management program according to the tenth aspect, wherein the electronic apparatus further includes a telecommunication unit, wherein the program makes the electronic apparatus carry out the process of transmitting the history information to another electronic apparatus by way of the telecommunication unit.

A twelfth aspect of the present invention is to provide the signal carrying a security management program according to the tenth aspect, wherein the program makes the electronic apparatus carry out the operation for inhibiting an access to the specific information in the case of the photographing apparatus being inoperable and/or in the case of the image of the operator obtained by the photographing apparatus being a failure.

A thirteenth aspect of the present invention is to provide a security management method, comprising: a first step for detecting an occurrence of an access to specific information; a second step for photographing an image of an operator of an electronic apparatus at the time of an occurrence of the access being detected; and a third step for recording the image by correlating with an information name invested to the information.

A fourteenth aspect of the present invention is to provide a security management method according to the thirteenth aspect, wherein the image together with the information name is transmitted to another electronic apparatus in the third step.

A fifteenth aspect of the present invention is to provide a security management method according to the thirteenth aspect, wherein an access to the specific information is inhibited in the case of unable to photograph the operator and/or in the case of the image of the operator being a failure in the second step.

The above described present invention is contrived to photograph, and store in history information, a picture or a video image of an operator at the time of an occurrence of an access to an important file for example, thereby making it possible to quickly understand, from the photographed picture or video image, a presence or absence of an information leakage or a leakage route by identifying a person who has illegitimately accessed a file or altered it.

Different from the conventional monitor-use camera, et cetera, the present invention is contrived to photograph an image of an operator only at the time of an occurrence of an access, thereby making it easy to judge whether or not an important file has been accessed and search for a person who has accessed. Furthermore, it enables a reduction of a capacity of a storage medium necessary for a security management because unnecessary image data (e.g., when files are not accessed).

If photographing is not possible by a camera and/or an image quality is low, access to a specific file is inhibited, thereby enabling a prevention of an illegitimate operation by the specific file being accessed in a condition of a monitoring by the camera not functioning.

In recent years, the practice of equipping a camera on electronic apparatuses has become popular as a result of the propagation of Web cameras for personal computers (PC) or of portable phones and PDAs with built-in cameras. The present invention does not require any special equipment except for a camera, and therefore has the advantage of accomplishing the above described benefit at an extremely low cost by using a camera attached to an electronic apparatus or an external camera, and firmware or software.

BRIEF DESCRIPTION OF THE DRAWINGS

FIG. 3 is a diagonal perspective view showing another external appearance of an electronic apparatus according to an embodiment of the present invention;

FIG. 7 is a conceptual diagram exemplifying a modified example structure of an access management file for use in an electronic apparatus according to an embodiment of the present invention;

FIG. 8 is a conceptual diagram exemplifying transmission information including access management information for use in an electronic apparatus according to an embodiment of the present invention; and FIG. 9 is a flow chart showing a modified example of an operation of an electronic apparatus according to an embodiment of the present invention.

DESCRIPTION OF THE PREFERRED EMBODIMENTS

The following is a detailed description of the preferred embodiment of the present invention by referring to the accompanying drawings.

Figure 1:
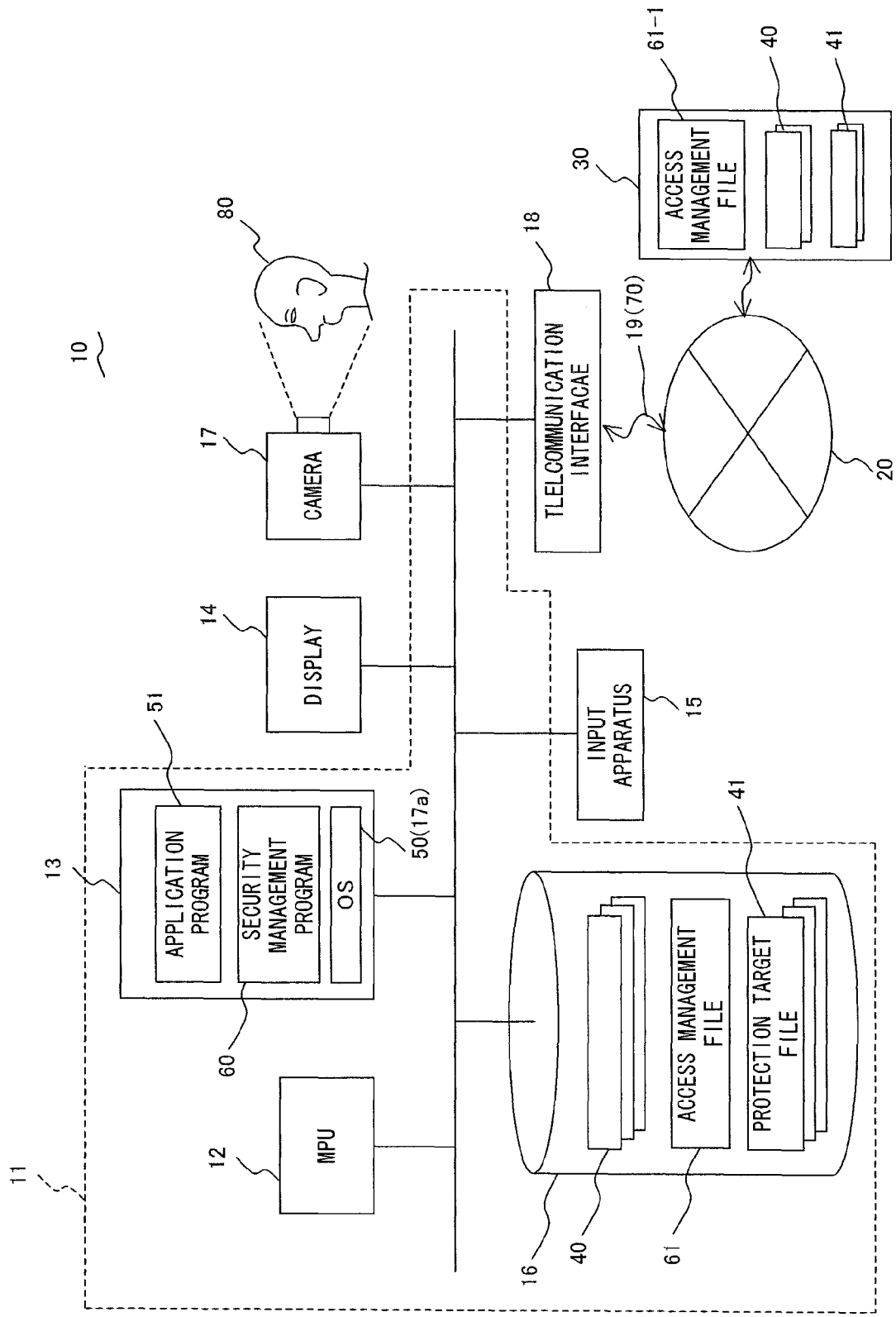
FIG. 1 is a block diagram exemplifying a configuration of an electronic apparatus embodying a security management program and a security management method according to an embodiment of the present invention.
Figure 2:
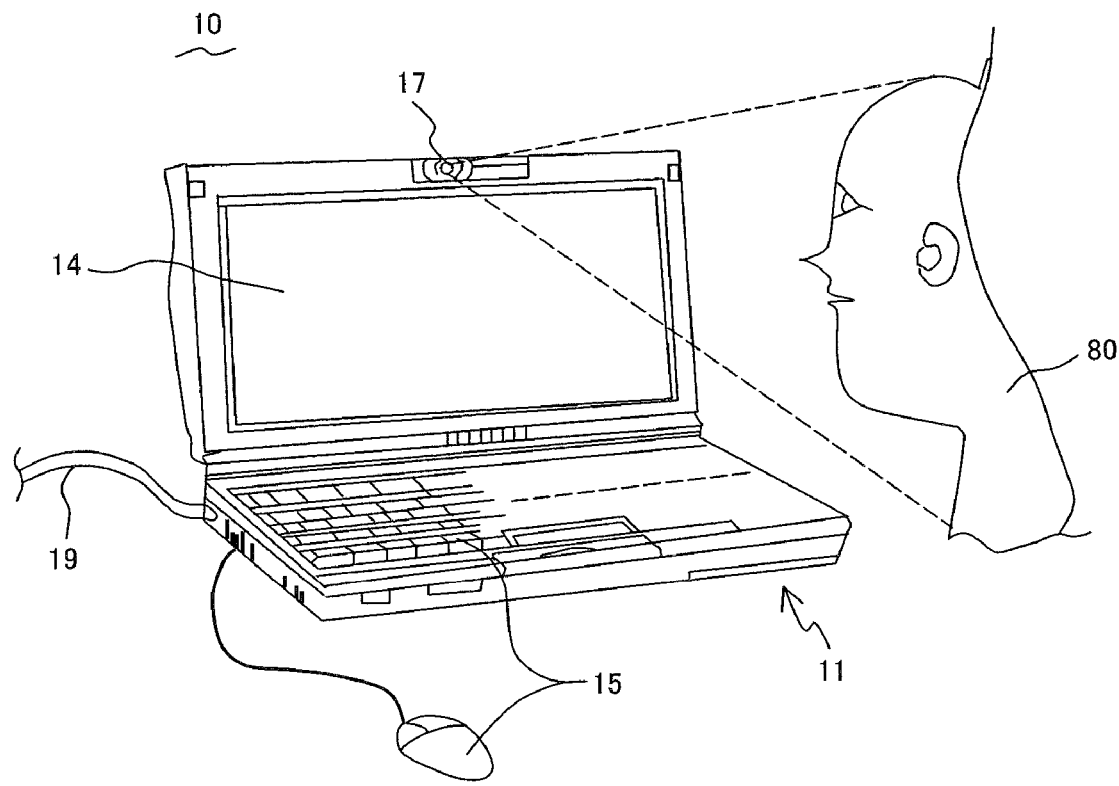
FIG. 2 is a diagonal perspective view exemplifying an external appearance of an electronic apparatus according to an embodiment of the present invention.

FIG. 1 is a block diagram exemplifying a configuration of an electronic apparatus embodying a security management program and a security management method according to an embodiment of the present invention; and FIG. 2 is a diagonal perspective view exemplifying an external appearance of an electronic apparatus according to the present embodiment.

An electronic apparatus 10 according to the present embodiment includes a frame 11, a central processing unit 12, a main storage 13, a display 14, an input apparatus 15, a storage apparatus 16, a camera 17 (i.e., a photographing apparatus) and a telecommunication interface 18.

The central processing unit 12 controls the entirety of the electronic apparatus 10 by using software and data stored by the main storage 13.

The main storage 13 retains the software and data executed by the central processing unit 12. The present embodiment is configured to store software including an operating system 50, an application program 51, et cetera, in the main storage 13 for the central processing unit 12 executing them.

The operating system 50 comprises a camera control function 17a (i.e., a photographing apparatus control unit) for controlling the camera 17. The application program 51 may be equipped with the camera control function 17a.

The display 14 provides an operator 80 operating the electronic apparatus 10 with a visualized display of information.

The input apparatus 15, being constituted by a user input interface such as key board and mouse, is used for an information input to the electronic apparatus 10 by the operator 80.

The storage apparatus 16, being constituted by nonvolatile semiconductor memory, hard disk drive, et cetera.

The storage apparatus 16 stores information, as a file 40, such as various data and software which are accessed at the time of executing the operating system 50 and application program 51.

The file 40 stored in the storage apparatus 16 is managed by a file system comprised by the operating system 50.

Although not particularly shown herein, the electronic apparatus 10 can comprise voice input and output interfaces such as a microphone and a speaker on an as required basis. In the case of the electronic apparatus 10 implementing a telephone function, it is possible to make the microphone and speaker function as transmitter and receiver, respectively.

The camera 17 photographs an image of an operator 80 operating the electronic apparatus 10. The configuration shown by FIG. 1 exemplifies an integration of the camera 17 with the electronic apparatus 10, the camera 17, however, may be placed apart from the frame 11 of the electronic apparatus 10. That is, the camera 17 may be discretionarily positioned provided that the operator 80 operating the electronic apparatus 10 can be photographed.

For instance, an image of the operator 80 operating the electronic apparatus 10 may be obtained from the camera 17 placed apart therefrom by way of the telecommunication interface 18 and a telecommunication media 19.

The telecommunication interface 18 connects to an information network 20 such as LAN and Internet by way of the telecommunication media 19 such as cable and radio waves.

Figure 4:
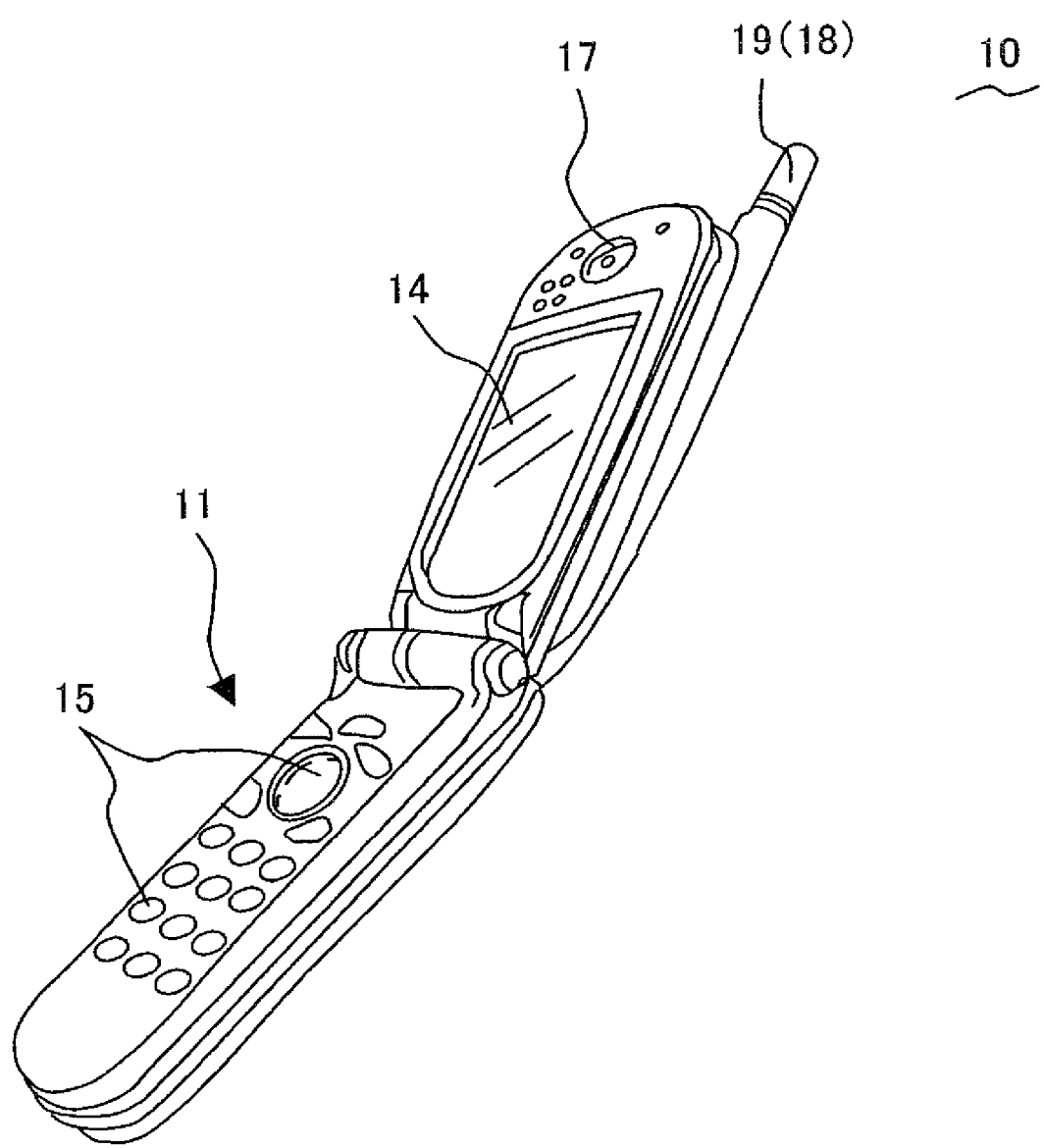
FIG. 4 is a diagonal perspective view showing another external appearance of an electronic apparatus according to an embodiment of the present invention.

Note that the electronic apparatus 10 according to the present embodiment may be a stationary PC exemplified by FIG. 3, or a portable phone or a PDA exemplified by FIG. 4 in lieu of being limited by the laptop PC exemplified by FIG. 2.

In the showing of FIGS. 2 through 4, the same component signs are assigned to parts corresponding to the components exemplified in FIG. 1.

The present embodiment is configured to install a security management program 60 as a utility program in the main storage 13 of the electronic apparatus 10 so as to carry out a security management for the file 40 stored by the storage apparatus 16.

That is, the security management program 60 is concerned with the file 40 (which is called a protection target file 41 hereinafter), which is designated in an access management file 61 as a target of security management, and makes the camera 17 photograph an image of an operator 80 at the time of occurrence of an access to the aforementioned protection target file 41 and records it.

Figure 5:
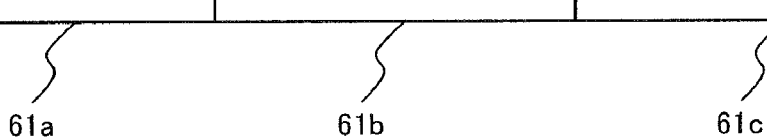
FIG. 5 is a conceptual diagram exemplifying a structure of an access management file for use in an electronic apparatus according to an embodiment of the present invention.

As exemplified in FIG. 5, the access management file 61 is configured to record a management target file name 61a, an access date & time 61b and user image information 61c by correlating the aforementioned three items of information.

A name of the protection target file 41 specified in advance as a target of security management among the files 40 is set in the management target file name 61a. That is, the file 40 whose name is set in the management target file name 61a constitutes a protection target file 41.

The access date & time 61b records information of the date and time of accessing (i.e., the photographed date and time) to the aforementioned protection target file 41.

Note that the file 40 and protection target file 41 may exist externally to the electronic apparatus 10, as described later. In such a case, the file 40 and protection target file 41 are accessed from the electronic apparatus 10 by way of the information network 20.

The user image information 61c records an image of an operator who has been operating the electronic apparatus 10 at the time of an occurrence of an access to the protection target file 41.

Incidentally, the user image information 61c may be a motion picture within a predefined time range straddling the access in lieu of being limited by a still picture.

The next description is of an example of operation of the electronic apparatus 10, security management program 60 and security management method according to the present embodiment.

First, a manager of the electronic apparatus 10 selects a file 40 for carrying out a security management, edit an access management file 61 and registers the file name of the selected file 40 (including a path name if appropriate) as a management target file name 61a in the access management file 61 (step 101).

And he or she adjusts a photographing angle, focus, et cetera, of the camera 17 so as to photograph a face and a feature of an operator 80 operating the electronic apparatus 10 (step 102).

Then, as an access occurs to a file 40 included in the storage apparatus 16 in the process of using the operating system 50 and application program 51 as a result of an operator 80 operating the input apparatus 15, the occurrence of the access is notified from the operating system 50 to the security management program 60.

For instance, the operating system 50 is capable of judging an occurrence of an access request to the file 40 by an occurrence of a "file open request" for the file 40 to the file system disposed for managing the storage apparatus 16.

Having received the notification of the access, the security management program 60 examines whether or not the file name of the notified file 40 is identical with an management target file name 61a which is registered in the access management file 61 (step 103).

If the judgment is that they are identical, the program makes the camera control function 17a comprised by the operating system 50 control the camera 17, thereby making camera 17 photograph a picture or a video image of the operator 80 in operation and registering it as the user image information 61c in the access management file 61 and also recording the date and time of the event at the access date & time 61b therein (step 104).

Note that the user image information 61c registered in the access management file 61 may be the image data per se of a photographed operator 80 or the information indicating an address of the file of the aforementioned image data.

The steps 103 and 104 are repeated during an operation of the electronic apparatus 10.

Then, in an event of an occurrence of a security problem relating to the file 40, such as illegitimate access, alteration, et cetera, the management target file name 61a of the access management file 61 is searched by the file name of the subject file 40 as a key.

This configuration makes it possible to immediately identify the information of the image, and date and time, of the person who has accessed to the subject file 40 (i.e., the protection target file 41).

As a result, the identification of the party accessing the subject file 40 (i.e., the protection target file 41) makes it possible to quickly determine an alteration of the file 40, a presence or absence of an information leakage, a leakage route, et cetera, thereby enabling a causal analysis and a prevention of recurrence thereafter.

That is, the conventional video image recording by a monitor camera has been taking a large amount of time and effort in order to analyze photographed images by reviewing them in an extended time period and collating them with the time of the access.

Comparably, the present embodiment is configured for enabling an immediate identification of a related person just by searching for a management target file name 61a and an access date & time 61b of the access management file 61 based on the concerned file name and the access date and time.

Since user image information 61c registered in the access management file 61 is photography data and/or a short piece of video image data, it is possible to greatly save a storage capacity of the storage apparatus 16 necessary for storing the access management file 61 as compared to the conventional long term video image recording method by a monitor camera, et cetera.

In other words, the present embodiment enables an accomplishment of an accurate and effective security management for a large number of protection target files 41 at low cost by means of a small storage capacity of the storage apparatus 16.

Note that the above description exemplifies the case of retaining the access management file 61 in the storage apparatus 16 internally to the electronic apparatus 10, the file, however, may be managed by storing in other place externally thereto. The following exemplifies such a case.

In this case, an electronic apparatus such as a security server 30 is connected to the information network 20, and a management is carried out by placing an access management file 61-1 internally to the security server 30, as exemplified in FIG. 1. Incidentally, the security server 30 can utilize another electronic apparatus 10.

As exemplified in FIG. 7, the access management file 61-1 is configured to add an item of an electronic apparatus ID 61d to the structure of the above described security management program 60.

The electronic apparatus ID 61d is information for identifying individual management target electronic apparatuses 10 (or the respective installation places) at the security server 30.

Figure 6:
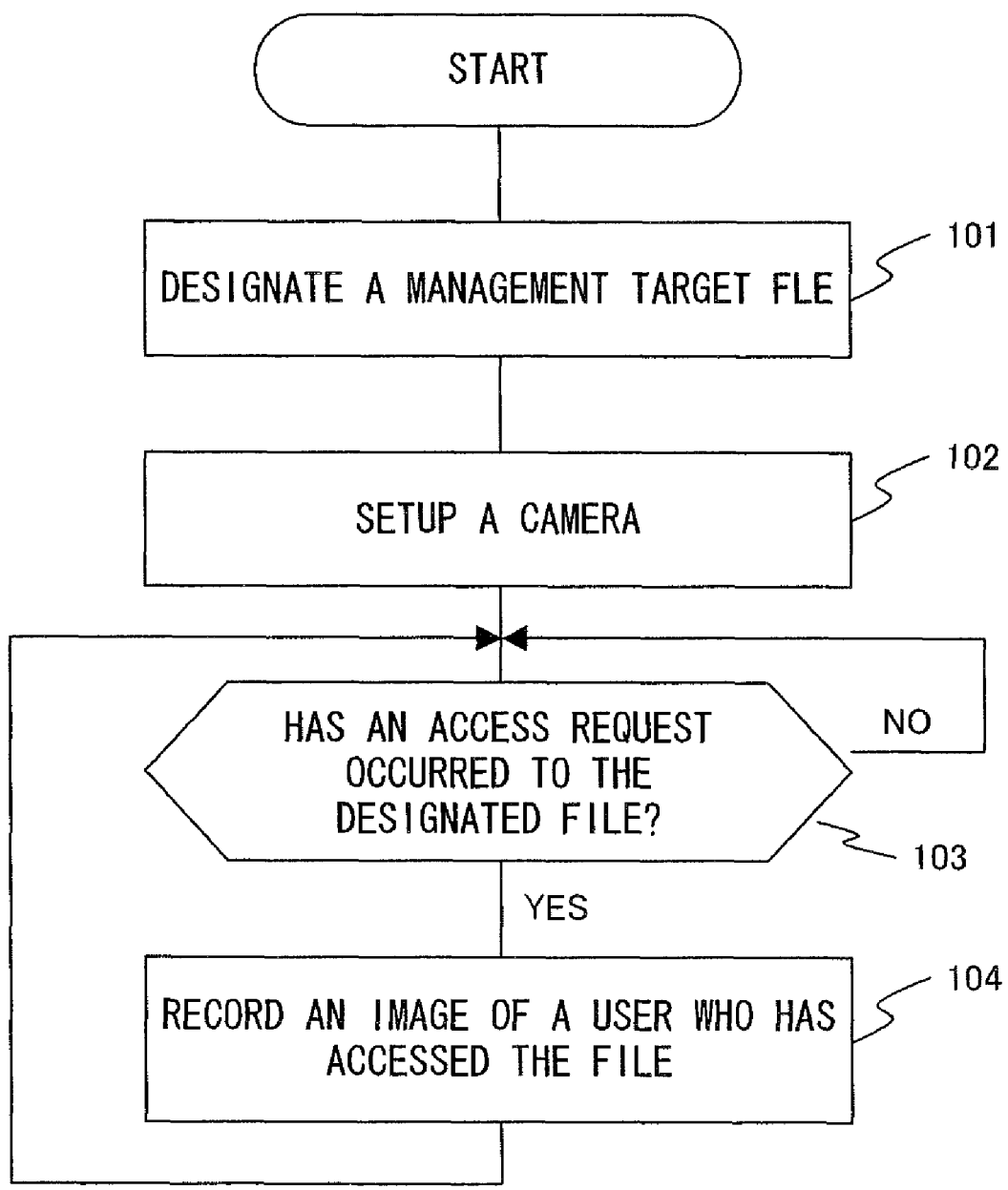
FIG. 6 is a flow chart exemplifying an operation of an electronic apparatus according to an embodiment of the present invention.

Then, the step 103 in the above described flow chart shown by FIG. 6 inquires, to the security server 30, whether or not the file 40 which has been notified by the operating system 50 of an access occurrence is in fact a protection target file 41.

The security server 30 searches a management target file name 61a setup in the access management file 61-1 and responds, to the security management program 60 of the electronic apparatus 10, as to whether or not the inquired file 40 is in fact a protection target file 41.

Also in the above described step 104, the security management program 60 of the electronic apparatus 10 transmits the photographed image of the operator 80 to the security server 30 by way of the telecommunication interface 18, telecommunication media 19 and information network 20 by using transmission information 70 in a format as exemplified by FIG. 8.

That is, the transmission information 70 includes an electronic apparatus ID 61d for identifying the electronic apparatus 10 (or its installed place), an access date and time 61b, a management target file name 61a and a user image information 61c.

Having received the transmission information 70 from the electronic apparatus 10, the security server 30 stores these items of information in the above described access management file 61-1.

In the case of managing the access management file 61-1 at the security server 30 other than the electronic apparatus 10 as described above, the information included in the access management file 61-1 will never be lost even if the electronic apparatus 10 per se should be stolen or destroyed.

This configuration therefore enables a security management for the files 40 of individual electronic apparatuses 10 with an increased safety and accuracy.

Note that the above description exemplifies the case of the files 40 and protection target file 41 existing in the storage apparatus 16 of the electronic apparatus 10, the present invention is not limited thereby.

That is, it is possible to apply to a security management in the case of placing the files 40 and protection target file 41 in an external electronic apparatus, e.g., a security server 30, other than the electronic apparatus 10, and accessing the external files 40 and protection target file 41 from the electronic apparatus 10.

Therefore, the present embodiment is applicable to the security managements for all of the following cases, i.e., all of the file 40, protection target file 41 and access management file 61 existing within the electronic apparatus 10; the file 40 and protection target file 41 existing within the electronic apparatus 10, while the access management file 61-1 existing externally thereto; and the file 40 and protection target file 41 existing externally to the electronic apparatus 10, while the access management file 61 existing therein.

In the case of the present embodiment, the practice of accurately photographing an image of the operator 80 at the time of an occurrence of an access to a protection target file 41 of the electronic apparatus 10 is important for accomplishing an effective security management.

Accordingly, the following description exemplifies the case of accomplishing an access management for a protection target file 41 based on a photographing condition of an operator 80 by the camera 17, as a modified example of the present embodiment.

FIG. 9 is a flow chart showing the modified example. The steps 201 through 203 are added to the flow chart exemplified by the above described FIG. 6.

That is, having judged as an occurrence of an access to the protection target file 41 in the step 103, the security management program 60 discerns a condition of the camera 17 relating to photographing the operator 80 before an actual access is started (step 201).

That is, the step 201 judges that the camera 17 is able to photograph the operator 80 provided that three conditions are all satisfied, i.e., the hardware of the camera 17 functions normally (a condition C1), the face of the operator 80 is photographed within the photographed image (a condition C2) and an the image of the photographed operator 80 is clear enough to discern him or her (a condition C3).

Only if the judgment is "able to photograph", the program notifies the operating system 50 of a permission for accessing the access requested protection target file 41 so as to continue the access (step 202).

If the judgment is "unable to photograph" in the above described step 201, the security management program 60 notifies the operating system 50 of a denial of the access request for the protection target file 41 (step 203).

In the case of the modified example, it is possible to prevent an access to the protection target file 41 in the conditions of the camera 17 being unable to photograph, or of unable to obtain an image of the operator 80 in good image quality.

That is, it is possible to securely prevent an illegitimate access to the protection target file 41 by the operator 80 by intentionally disabling the camera 17 or operating the electronic apparatus 10 in the condition of averting his/her face from a photographing range of the camera 17.

Note that the above description exemplifies the case of equipping the security management program 60 independently from either of the operating system 50 and application program 51, the present invention, however, is not limited thereby.

That is, the function of the security management program 60 may be installed in a part of the application program 51, in which case a timing of the application program 51 issuing a file-open request for a protection target file 41 to the operating system 50 is detected in the inside of the application program 51, thereby enabling a discernment of a presence or absence of an occurrence of an access request for the protection target file 41. Also enabled is a denial of access to the protection target file 41 (i.e., the above described step 203) can be managed in the inside of the application program 51.

Yet in another example, the function of the security management program 60 may be installed in a part of the operating system 50.

In this case, the operating system 50 is enabled to discern a presence or absence of an occurrence of an access request for the protection target file 41 by a presence or absence of a file-open request for the protection target file 41 requested from the application program 51 to the operating system 50.

Since a file 40 (i.e., a protection target file 41) within the storage apparatus 16 is under the management of a file system of the operating system 50, it is possible to easily accomplish a denial to an access request (i.e., the above described step 203) for the protection target file 41 from the application program 51.

Note that the present invention can apparently be changed in various ways within the scope thereof in lieu of being limited by the configurations exemplified in the above described embodiments.

The present invention makes it possible to quickly identify a user who has accessed information of an electronic apparatus.

It also enables an accomplishment of a security management for information by using an image without requiring a large storage resource for accumulating images.

It also enables a prevention of an illegitimate operation.

What is claimed is:

1. An electronic apparatus, comprising:
   a photographing apparatus control unit to control a photographing apparatus; and
   an access management unit to perform an operation recording, in history information by correlating with an information name invested to specific information, which is designated as a target of security management, an image of an operator photographed by way of the photographing apparatus control unit at the time of an occurrence of an access to the specific information, wherein
   said access management unit performs an operation permitting said access to said specific information when all of the following conditions are satisfied,
      said photographing apparatus functions normally,
      a face of said operator is photographed within said image of said operator obtained by the photographing apparatus, and
      said image has sufficient quality to discern said operator, and
   said access management unit inhibits the operation permitting said access to said specific information when any of the following conditions are satisfied,
      said photographing apparatus does not function normally,
      said face of said operator is not photographed within said image of said operator obtained by the photographing apparatus, and
      said image has insufficient quality to discern said operator.

2. The electronic apparatus according to claim 1, further comprising:
   a telecommunication unit, wherein
   said access management unit performs an operation transmitting said history information to another electronic apparatus by way of the telecommunication unit.

3. The electronic apparatus according to claim 1, wherein said history information includes said information name invested to said specific information, said image information of said operator and a photographed date and time.

4. The electronic apparatus according to claim 1, wherein said history information includes apparatus identifier information invested to said electronic apparatus of a transmission origin or an installed place thereof, said information name invested to said specific information, said image information of said operator and a photographed date and time in the case of transmitting the aforementioned history information to another of the electronic apparatus.

5. The electronic apparatus according to claim 1, wherein said access management unit constitutes a part of a non-transitory computer readable storage medium for storing an application program executed at said electronic apparatus and detects, in the inside of the aforementioned application program, an operation of said operator accessing said specific information.

6. The electronic apparatus according to claim 1, wherein said access management unit constitutes a part of a non-transitory computer readable storage medium for storing an operating system installed in said electronic apparatus, and detects an occurrence of an access request for said specific information, which is requested from a non-transitory computer readable storage medium for storing an application program operating on the operating system to the aforementioned operating system.

7. The electronic apparatus according to claim 1, wherein said access management unit is constituted by a non-transitory computer readable storage medium for storing a utility program differing from a non-transitory computer readable storage medium for storing an operating system and a non-transitory computer readable storage medium for storing an application program which are installed in said electronic apparatus, and detects, by way of the aforementioned operating system, an occurrence of an access request for said specific information, which is requested from a non-transitory computer readable storage medium for storing an application program operating on the operating system to the aforementioned operating system.

8. The electronic apparatus according to claim 1, wherein said photographing apparatus is placed apart from a frame of said electronic apparatus.

9. A non-transitory computer readable storage medium for storing a security management program installed in an electronic apparatus, wherein the program makes the electronic apparatus carry out the processes of:

detecting whether or not an access to a specific information, which is designated as a target of security management, has occurred as a result of operating the electronic apparatus;

photographing, by using a photographing apparatus, an image of an operator of the electronic apparatus at the time of an occurrence of the access;

recording, in history information, the image by correlating with an information name invested to the specific information;

performing an operation permitting said access to said specific information when all of the following conditions are satisfied,
said photographing apparatus functions normally,
a face of said operator is photographed within said image of said operator obtained by the photographing apparatus, and
said image has sufficient quality to discern said operator, and inhibiting the operation permitting said access to said specific information when any of the following conditions are satisfied,
said photographing apparatus does not function normally,
said face of said operator is not photographed within said image of said operator obtained by the photographing apparatus, and
said image has insufficient quality to discern said operator.

10. The non-transitory computer readable storage medium for storing a security management program according to claim 9, wherein
said electronic apparatus further comprises a telecommunication unit, wherein
the program makes the electronic apparatus carry out the process of transmitting said history information to another electronic apparatus by way of the telecommunication unit.

11. A security management method, comprising:

detecting an occurrence of an access to specific information, which is designated as a target of security management;

photographing an image of an operator of an electronic apparatus at the time of an occurrence of the access being detected;

recording the image by correlating with an information name invested to the information;

performing an operation permitting said access to said specific information when all of the following conditions are satisfied,
said photographing apparatus functions normally,
a face of said operator is photographed within said image of said operator obtained by the photographing apparatus, and
said image has sufficient quality to discern said operator, and inhibiting the operation permitting said access to said specific information when any of the following conditions are satisfied,
said photographing apparatus does not function normally,
said face of said operator is not photographed within said image of said operator obtained by the photographing apparatus, and
said image has insufficient quality to discern said operator.

12. The security management method according to claim 11, wherein
said image together with said information name is transmitted to another electronic apparatus in said recording.

* * * * *